Nov. 6, 1934.    M. I. VESTAL    1,980,145
TRANSMISSION DEVICE
Filed March 8, 1932    2 Sheets-Sheet 1
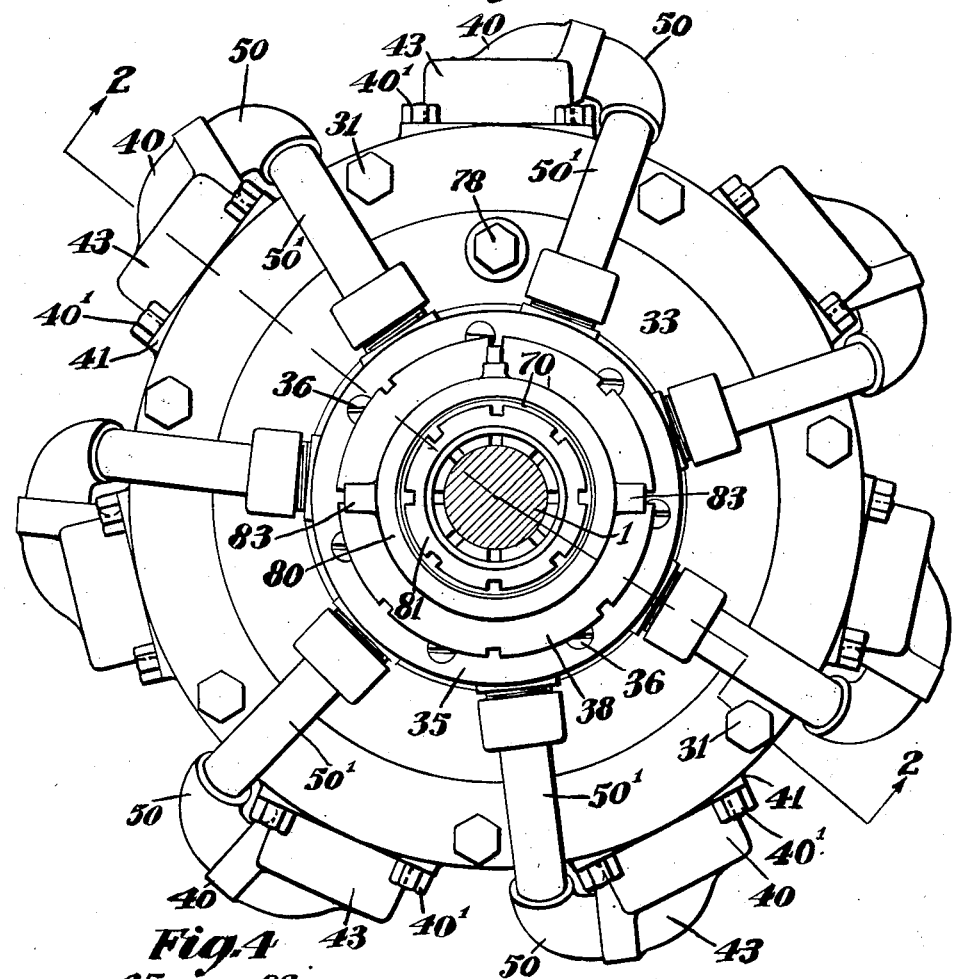
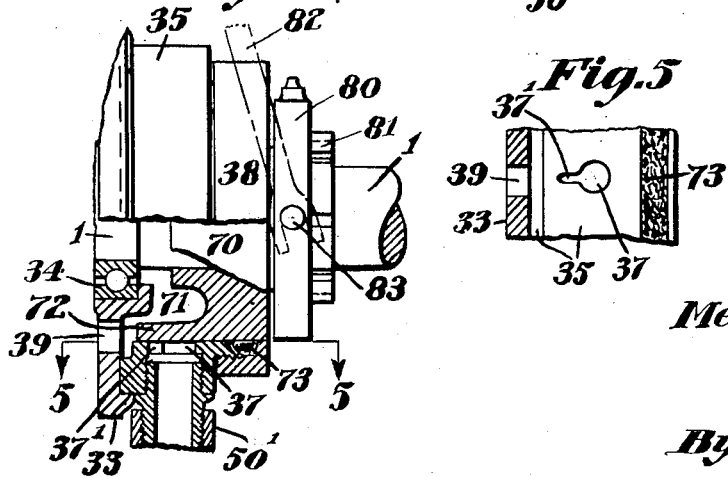
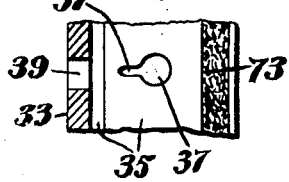
Inventor
Merton I. Vestal
By Attorney

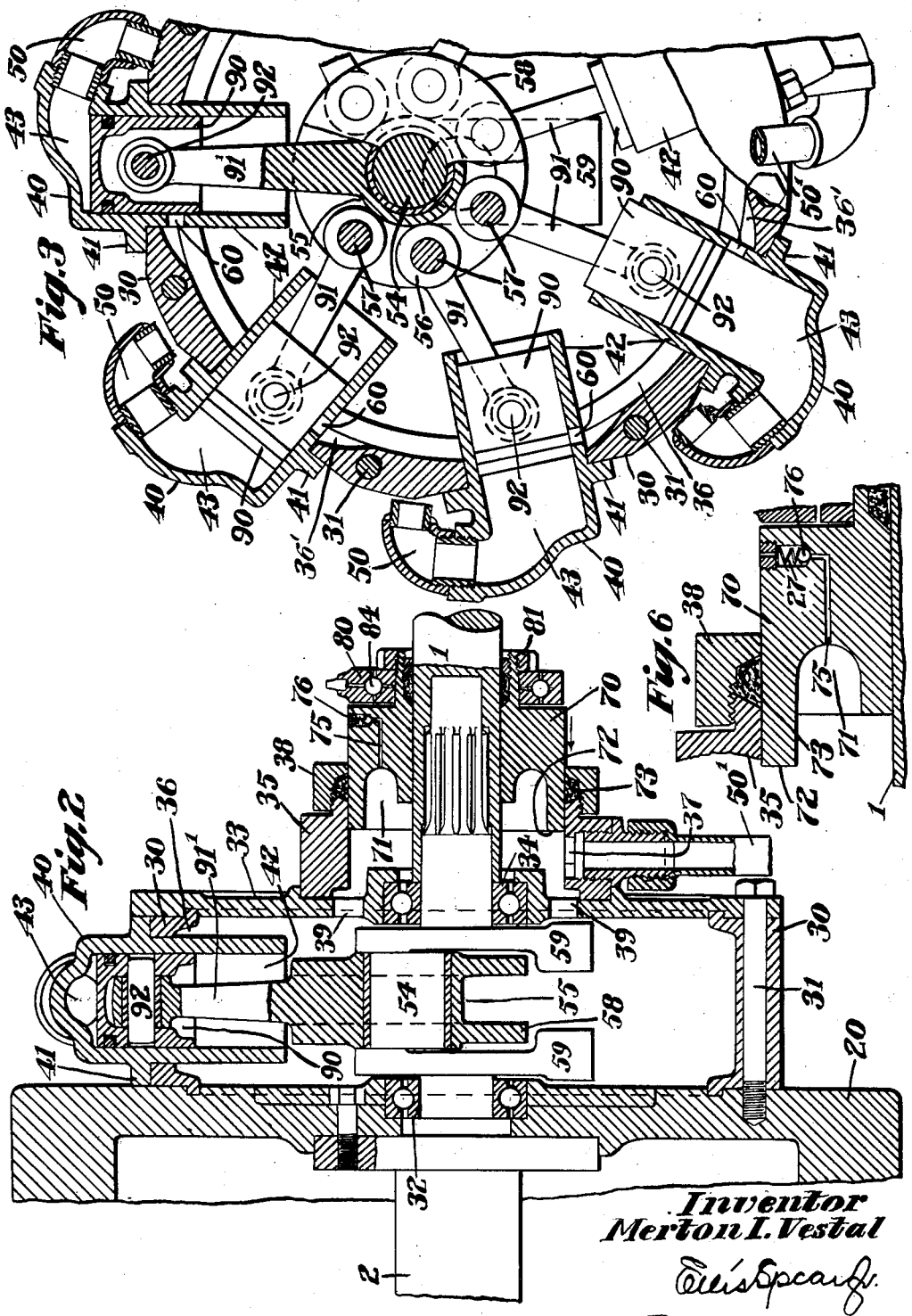

Patented Nov. 6, 1934

1,980,145

UNITED STATES PATENT OFFICE 1,980,145

TRANSMISSION DEVICE

Merton Irving Vestal, Fall River, Mass., assignor of one-half to Albert A. Harrison, Fall River, Mass.

Application March 8, 1932, Serial No. 597,523

14 Claims. (Cl. 192—60)

In variable speed transmissions by fluid control, there has been clearly indicated in the prior patent art, a quite general acceptance of the radial piston or so-called dash pot principle.

A considerable range of devices on this principle have been patented from time to time for many years, but have failed to take satisfactory commercial form in spite of the obvious demand reflected in this very considerable effort in these prior patents.

While I believe that the old principle of a throttled fluid discharge from a series of radially acting pumping devices interposed between a driving and a driven member is generally correct, it has not according to my concept been correctly applied and consistently carried out.

The factors demanded in such a device are smooth balanced transmission of power from a necessarily imperfectly balanced and really intermittent source, such as an internal combustion engine of the impulse type to loads of widely varying demand and resistance.

The fluid pressure control theoretically offers just this advantage over the more abrupt mechanical operations of gear shift and clutch systems.

My analysis of past difficulties in the art confirms my concept that such fluid pressure devices should not be predicated on ordinary pumping principles of discharge. The analogy is so close as to be misleading. My invention represents simple departure in principle by which I am able to make devices otherwise structurally featured as indicated desirable in the prior art and yet fully and efficiently operable.

The various features will be more fully noted from a characteristic embodiment which I will show and describe. Because of my use, however, of old mechanical parts indicated as desirable in the prior art, it is necessary to note a really very important difference.

As will be seen later, my cylinders are fed by a free centrifugal charge as the piston is at bottom position of stroke. There is no factor of varying suction in intake. The effective stroke is one of simple definite discharge unmodified save as it is itself throttled to get the desired resistance.

This in itself is seemingly so simple and yet so important a departure as to be liable to be overlooked, as in fact it was by those laboring in the prior art.

To afford a basis of complete disclosure, but not to be understood as limited in detail thereby, I have shown in the accompanying drawings a transmission in accordance with my invention.

Fig. 1 is a face elevation of a characteristic seven piston unit.

Fig. 2 a transverse section on the line 2—2, of Fig. 1.

Fig. 3 a fragmentary view sectioned transversely to that of Fig. 2.

Fig. 4 a partly sectioned side elevation of the exhaust control.

Fig. 5 a section on the line 5—5, of Fig. 4, showing an exhaust valve port, and

Fig. 6 is a detail of the valve air vent system.

The characteristic installation shown comprises a driven shaft 1 and a driving shaft 2 on which is indicated in fragment a fly-wheel 20 usually present in such an installation, but not necessarily so.

The casing is attached to the fly-wheel 20 as at 31 and includes a peripheral plate 30 and a side plate 33. The side plate 33 has a bearing 34 for the shaft 1 and has a valve casing hub 35 attached by fastenings 36. The bearing 32 is located in a recess in the face of the fly-wheel 20. This hub 35 is the exhaust hub and is valve controlled as will be later described.

Radially mounted on the rim 30 are a plurality of cylinder members 40. These are flanged as at 41 and bolted as at $40^1$ to spaced, flattened seats on the exterior of the rim 30. While their inner ends 42 extend within the rim 30, which constitutes the periphery of the fluid casing, the effective capacity of the cylinder 40 is in the exterior portion 43. From this outer portion 43 lead the exhaust discharges 50 connected by radial pipes $50^1$ to the hub 35 in which the exhaust is controlled as it is forced from the periphery of the casing as the unit operates.

The interior of the hub 35 connects with the interior of the casing 30 for the return of the oil, as at 39. Within the cylinders 40 are pistons 90. The connecting rod $91^1$ is the master rod and has a bearing 55 on the crank 54 of the driven shaft 1. The other six connecting rods 91 have bearings 56 at their inner ends working on a series of crank pins 57 spaced between the flanges 58 formed by the bearing 55 of the master rod $91^1$. This crank assembly is balanced by counterweights 59. The connecting rods are each wrist-pinned to its respective piston as at 92. The pistons 90 preferably have a rather short and definite stroke which is effective outwardly.

The cylinders 40 have intake ports 60 which are disposed adjacent the inner periphery of the casing 30 and so are effectively charged by the oil or other casing fluid. The casing rim 30 has a peripheral channel 36 and is notched out as at 36¹ adjacent the intake ports to permit a free flow of the oil to the port. These ports 60 are on the forward side of the cylinders 40 or in opposition to rotation and thus receive the full centrifugal and peripheral effect of the rotation of the casing on the fluid medium.

The discharge of the fluid through the ports 60 is oppositely and rearwardly released as at 50 so that the unit operated without any uncertain or inconstant back pressures when idling. When in operation the control is a definite throttling. This is effected by the sliding valve 70 within the valve casing or hub 35 and surrounding the shaft 1. The forward face of the valve block 70 is provided with an annular recess 71 having an outer flange 72 which covers or uncovers the exhaust ports 37 to which the exhaust pipes 50¹ deliver.

As shown in the section in Fig. 5, the ports 37 are of keyhole shape, the narrow slot portion 37¹ affording the valve flange 72 a sufficient movement to throttle down gradually to closed position (Fig. 4) from wide open or idling position (Fig. 2).

The valve 70 is held fluid tight in its movement within the casing 35 by a packing gland 38. The valve has a gland packing 73 to prevent leakage around the shaft 1.

The valve channel 71 is vented as at the breather 75, the escape being controlled by a spring pressed ball valve 76 (Fig. 2). An operating ring 80 is held on the outer end of the valve 70 by a collar 81 threaded thereon. The ring 80 is provided with ball bearings as at 84. As indicated in Fig. 4, this may be moved as by a forked lever indicated in dotted lines at 82 and engaging the ring studs 83, (Fig. 4).

In operation when the driving shaft 2 is rotated with the valve 70 open as in Fig. 2, the pistons 90 are reciprocated in their cylinders through their connecting rods. The oil within the casing will begin to be picked up in the cylinders through the ports 60 fed from the channels 36 through the notches 36¹.

The cylinders are fed at the full instroke position of each piston. In this position, as appears at the bottom of Fig. 3, the outer end of the piston is just above the bottom of the channel 36 which constitutes the extreme inner periphery of the casing. In this position it has uncovered the intake cylinder port 60 which it again covers as it moves out on its pumping stroke. The oil is discharged at the outlets 50 through the pipes 50¹ to the valve casing 35.

With the valve 70 open the oil returns to the main casing. This is an idling operation and the shaft 1 is not rotated.

When power is to be applied to the driven shaft 1 the valve 70 is pushed in so that its edge 72 begins to cover the port 37 and obstruct the freedom of the flow of the oil through that port. As the valve 70 is moved in to close the ports 37 particularly in making a sudden change of speed, air pressure or suction is apt to develop. This may cause leakages particularly at the packings and I have therefore conceived of a venting system as noted above. In this the ball 76 which is lifted by centrifugal action against its spring 77 opens the passage 75 so that any air pressure or suction is relieved. As the oil is free to return to the main casing through the large openings 39 there is no tendency to escape through the small passage 75 even when the ball 76 is opened up. When not rotating the spring 77 closes the ball on its seat. A filling plug is indicated at 78 (Fig. 1) for the casing oil.

As the pressure builds up in the discharge pipes 51¹ and the pistons meet increasing resistance, the entire driven assembly begins to turn. Increased closing of the valve gives increased resistance until when fully closed the installation moves as a direct drive from the shaft 2 to the shaft 1. This drive, of course, can be released gradually or abruptly by the valve 70.

While this in general is the usual operation of such devices, my invention makes for great smoothness, and regularity under variations of power and load. As the casing takes up rotations, the contained oil is circulated radially. The outer portions 43 of the cylinders 40 are thus charged through open intakes (preferably without valves) and without any dependence on suction from the piston.

The effective strokes of the pistons are the outward strokes and the independence of the pistons because the cylinders are charged at the casing periphery by the centrifuge and peripheral movement of the oil frees the discharge from conflicting influences. The control is therefore smooth at all speeds and variations of load or drive.

In such an installation as shown the shaft 1 is the driven shaft and the shaft 2 the driving or engine shaft carrying the fly-wheel 20 and the transmission casing.

This is preferable as the casing is constantly rotated and the centrifugal and also the peripheral action of the oil is immediately and constantly effective. While devices in accordance with my invention can be made to run in reverse the results are not as good as the centrifugal action is not effective in starting. There is advantage also as in the illustrative device as shown in that the fly-wheel may be in combination with the casing, making possible many very efficient designs for all sorts of installations and all sorts of purposes.

My invention is capable of various embodiments and uses. Transmissions in accordance with it may be and necessarily will be varied in design to suit intended installations. The numbers of cylinders may be varied and types of connections and controls changed as desired. If the principles of my concept be adhered to the advantages of my invention will follow.

What I therefore claim and desire to secure by Letters Patent is:—

1. In a transmission device, a driving shaft, a driven shaft, a closed fluid casing rotatable with the driving shaft, a plurality of cylinders radially disposed in said casing, pistons in said cylinders, connections between the pistons and the driven shaft, said cylinders extending substantially beyond the periphery of the casing and said piston stroke ending just within said periphery, intake ports substantially at the inner periphery surface and disposed in the direction of rotation of the casing and positioned so as to be uncovered by the pistons at the bottom of the stroke, discharge ports in said cylinders and leading to the interior of the casing, and means for simultaneously obstructing the cylinder discharges.

2. In a transmission device, a driving shaft, a driven shaft, a closed fluid casing rotatable with the driving shaft, a plurality of cylinders radially disposed in said casing, pistons in said cylinders, connections between the pistons and the driven shaft, said cylinders extending substantially beyond the periphery of the casing and said piston stroke ending just within said periphery, intake ports substantially at the inner periphery surface and disposed in the direction of rotation of the casing and positioned so as to be uncovered by the pistons at the bottom of the stroke, oppositely disposed discharge ports in said cylinders and leading to the interior of the casing, and means for simultaneously obstructing the cylinder discharges.

3. In a transmission device, a driving shaft, a driven shaft, a rotatable fluid casing, a plurality of cylinders radially disposed in said casing, pistons in said cylinders, operative connections between the pistons and shaft, said cylinders extending substantially beyond the periphery of the casing and said piston stroke ending just within said periphery, intake ports substantially at the inner periphery surface and disposed so as to be uncovered by the pistons at the bottom of the stroke, discharge ports in said cylinders and leading to the interior of the casing, and means for simultaneously obstructing the cylinder discharges.

4. In a transmission device, a driving shaft, a driven shaft, a closed casing rotatable with the driving shaft, a plurality of cylinders radially disposed in said casing, pistons in said cylinders, connections between the pistons and the driven shaft, said cylinders extending substantially beyond the periphery of the casing and said piston stroke ending just within said periphery, intake ports substantially at the inner periphery surface and disposed so as to be uncovered by the pistons at the bottom of the stroke, discharge ports in said cylinders and leading to the interior of the casing, and means for simultaneously obstructing the cylinder discharges.

5. In a transmission device, a driving shaft, a driven shaft, a closed casing rotatable with the driving shaft, a plurality of cylinders radially disposed in said casing, pistons in said cylinders, connections between the pistons and the driven shaft, said cylinders extending substantially beyond the periphery of the casing and said piston stroke ending just within said periphery, intake ports substantially at the inner periphery surface and disposed so as to be uncovered by the pistons at the bottom of the stroke, oppositely disposed discharge ports in said cylinders and leading to the interior of the casing, and means for simultaneously obstructing the cylinder discharges.

6. In a transmission device, a driving shaft, a driven shaft, a closed casing rotatable with one of the shafts, a plurality of cylinders radially disposed in said casing, pistons in said cylinders, operating connections between the pistons and the other shaft, intake and discharge ports in said cylinders, a valve casing opening to the main casing and having ports connected to the discharge ports and having a valve slidable therein to cover and uncover the valve ports, said valve having a vent and an outwardly opening centrifugally operated valve in said vent to open when the valve is in rotation.

7. In a fluid pressure transmission device, a driving and a driven member, an oil casing rotatable with one of the members, a control valve on the main casing and rotatable therewith, oil discharging means in the casing and connecting with the valve casing, said control valve having an air vent and an outwardly opening centrifugally operated valve for said vent for relieving the valve during rotation.

8. A transmission device, driving and driven elements, a closed fluid casing rotatable with the driving element, a plurality of radial cylinders carried with said casing and having their outer ends disposed beyond the inner periphery of the casing and having intake ports adjacent the inner periphery of the fluid casing and disposed in the direction of rotation thereof, pistons in said cylinders, connections between the driven element and the pistons and effective to cause the piston to uncover said ports at the inner end of their stroke, outlet ports for said cylinders discharging oppositely to said intake ports and communicating with the fluid casing, and means for obstructing the cylinder discharges.

9. A transmission device, driving and driven elements, a closed fluid casing rotatable with the driving element, a plurality of radial cylinders carried with said casing and having their outer ends disposed beyond the inner periphery of the casing and having intake ports adjacent the inner periphery of the fluid casing, pistons in said cylinders, connections between the driven element and the pistons and effective to cause the piston to uncover said ports at the inner end of their stroke, discharge ports for said cylinders and communicating with the fluid casing, and means for obstructing the cylinder discharges.

10. A transmission device, driving and driven elements, casing rotatable with the driving element and confining a body of fluid, a plurality of cylinders carried with said casing and having their effective ends disposed beyond the inner periphery of the casing and having intake ports communicating with the fluid casing adjacent said inner periphery thereof, pistons in said cylinders, connections between the driven element and the pistons and effective to cause the piston to uncover said ports at the inner end of their stroke, discharge ports for said cylinders and communicating with the fluid confining means, and a fluid control for obstructing the cylinder discharges.

11. A transmission device comprising driving and driven elements, a closed fluid casing rotatable with the driving element, the wall of said casing having a peripheral channel including sunken portions, a plurality of radial cylinders carried with said casing and having their outer ends disposed beyond said channel, and having intake ports adjacent said sunken portions, pistons in said cylinders, connections between the driven element and the pistons and effective to cause the piston to uncover the said ports at the inner end of their stroke, outlet ports for said cylinders communicating with the fluid casing, and means for obstructing the cylinder discharges.

12. A transmission device comprising driving and driven elements, a closed fluid casing rotatable with the driving element and having a hub providing a valve casing, a plurality of cylinders carried with said casing and having their effective ends disposed beyond the inner periphery thereof, and having intake ports adjacent said inner periphery, pistons in said cylinders, connections between the driven element and the pistons and effective to cause the piston to uncover the ports at the inner end of their stroke, outlet ports for said cylinders discharging into said hub, and valves controlling the passage of the discharged fluid from the hub to the casing.

13. A transmission device comprising driving and driven elements, a closed fluid casing rotatable with the driving element and having a valve casing about said driving element, a plurality of cylinders carried with said fluid casing and having their effective ends disposed beyond the inner periphery thereof, and having intake ports adjacent said inner periphery, pistons in said cylinders, connections from the driven element to the pistons and effective to cause the piston to uncover said ports at the inner end of their stroke, discharge ports comprising radial pipes extending from the outer end of said cylinders externally of said casing and discharging into said valve casing, connections from the valve casing to the fluid casing, and valves controlling the passage of the discharged fluid therethrough.

14. A transmission device comprising driving and driven elements, a closed fluid casing rotatable with the driving element and having a valve casing about said driving element, a plurality of cylinders carried with said fluid casing and extending beyond the periphery thereof, intake ports to said cylinders within said casing, pistons in said cylinders, connections from the driven element to the pistons and effective to uncover said intake ports, discharge ports comprising radial pipes extending from the outer end of said cylinders externally of said casing and discharging into said valve casing, connections from the valve casing to the fluid casing and valves controlling the passage of the discharged fluid therethrough.

MERTON IRVING VESTAL.